United States Patent

[11] 3,607,208

| [72] | Inventor | George A. Kapral |
| | | Corning, N.Y. |
| [21] | Appl. No. | 872,490 |
| [22] | Filed | Oct. 30, 1969 |
| [45] | Patented | Sept. 21, 1971 |
| [73] | Assignee | Corning Glass Works |
| | | Corning, N.Y. |

[54] MOLTEN GLASS SHEARS
2 Claims, 9 Drawing Figs.

[52] U.S. Cl.............................................. 65/334,
65/127, 65/133, 65/207, 65/333
[51] Int. Cl............................................. C03b 5/38
[50] Field of Search................................... 65/133,
334, 127, 207

[56] References Cited
UNITED STATES PATENTS

| 1,207,363 | 12/1916 | Bridges............. | 65/334 X |
| 1,576,734 | 3/1926 | Ferngren............ | 65/334 X |
| 2,042,994 | 6/1936 | Honiss............... | 65/334 X |
| 3,119,679 | 1/1964 | Seymour............ | 65/127 |
| 3,264,077 | 8/1966 | Bishop.............. | 65/133 X |
| 3,490,326 | 1/1970 | McNamara........ | 65/334 X |

Primary Examiner—Frank W. Miga
Attorneys—Clarence R. Patty, Jr. and Charles W. Gregg ABSTRACT: Modification of one blade of a pair of shears used for cutting off elongated mold charges from columns or streams of molten glass issuing from a discharge orifice in the bottom of a forehearth. Modification comprises increasing the thickness of the lower blade of the shears in selected regions thereof so that each mold charge, immediately following its sheared separation from a column of molten glass, is contacted and pushed by the lower surface of the lower blade and thereby turned so that it lands on its side in its forming mold cavity. Heretofore, glass-charge contact members or so-called "bumpers" were used to turn the glass charges but such devices often caused objectional "bumper marks" in the articles subsequently formed from the glass charges. Such marks are eliminated by the use of shears of the present disclosure.

INVENTOR.
George A. Kapral
BY Charles W. Gregg
AGENT

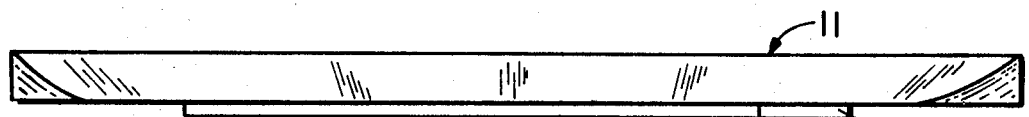
Fig. 3
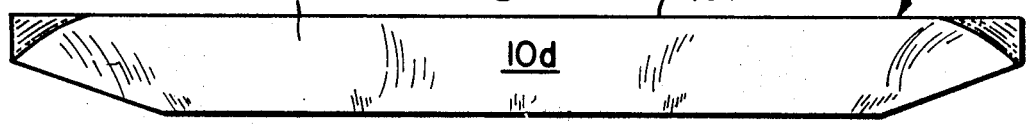
Fig. 4
Fig. 5
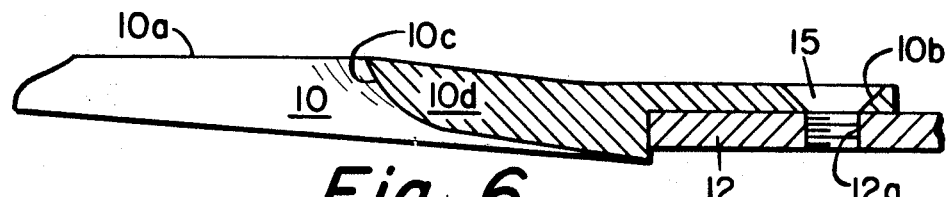
Fig. 6
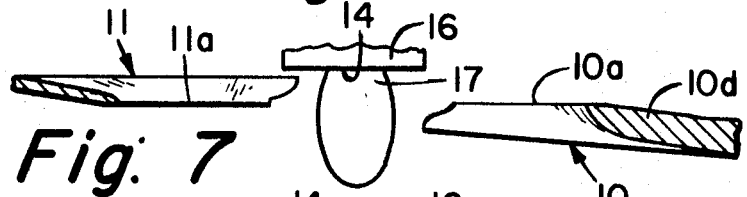
Fig. 7
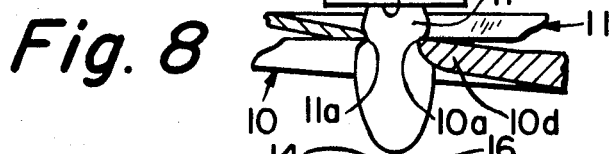
Fig. 8
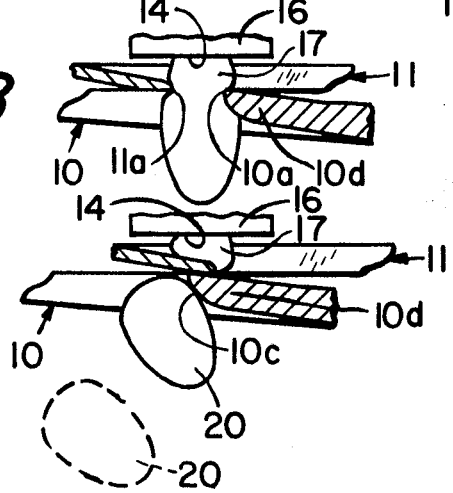
Fig. 9
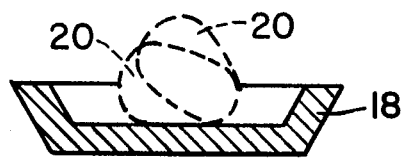
INVENTOR.
George A. Kapral
BY Charles W. Gregg
AGENT

MOLTEN GLASS SHEARS

BACKGROUND OF THE INVENTION

It has been found desirable in the production of glass articles, such as faceplates for cathode ray tube envelopes for example, to deliver relatively elongate charges of molten glass to their forming mold cavities so that such charges land on their sides in their respective mold cavities, or so that the glass charges will at least land in said cavities so that they assume a horizontal position therein. To accomplish such end, so-called glass charge bumpers or contact members have heretofore been employed.

There is disclosed, for example, in U.S. Pat. No. 2,812,619, issued Nov. 12, 1957 to Frederick J. Wythe and entitled "Glass Feeder Shears Provided with Charge Turning Mechanism," a glass charge contact member which accomplishes the desired turning of glass charges. Such contact member is designated by the reference character 37 in FIGS. 1, 5, 6, 7 and 8 of the Wythe patent. The use of glass-charge contact members or bumpers such as disclosed in said patent has been found to oftentimes cause bumper marks or charge contact member marks in the articles or ware formed from the charges of molten glass. While the cause of the bumper marks is not definitely known, it is believed that such marks are caused by the chilling of the areas of the glass charges which are contacted by the bumpers or charge contact members.

The aforesaid bumper marks in the formed ware or articles are not objectionable when such ware or articles are ordinary glass items but when, for example, the ware or articles being formed are to have high optical qualities, as with the previously mentioned faceplates for cathode-ray tube envelopes, the bumper marks may not be tolerable. Accordingly, the molten glass shears of the present invention were developed to eliminate the bumper marks often caused by the bumpers or glass-charge contact members of the prior art.

SUMMARY OF THE INVENTION

In practicing the invention, a pair of molten glass shears having an upper blade of a conventional shape are employed. However, the lower surface of the lower blade of such pair of shears is modified by increasing the thickness of such blade in certain regions thereof. By such modification the lower blade of the shears imparts a moment of turning motion to each of the molten glass charges to cause such charges to assume or to be delivered to their respective forming molds in a horizontal position without the undersired bumper marks on the articles or wares subsequently formed from the glass charges.

The invention will best be understood with reference to the accompanying drawings taken in conjunction with the description which follows.

BRIEF DESCRIPTION OF THE DRAWINGS

In the drawings:

FIGS. 3 and 4 are end views of the upper and lower blades, respectively, of the shears of FIG. 1, such views being taken along lines 3—3 and 4—4, respectively, of FIG. 1;

FIGS. 5 and 6 are cross-sectional views of the upper and lower blades, respectively, of the shears of FIG. 1, such views being taken along lines 5—5 and 6—6, respectively, of FIG. 1; and FIGS. 7, 8 and 9 are schematic views illustrating the operation of the lower blade of the shears in imparting a moment of turning motion to a molten glass charge following the severing thereof from a parent column or stream of molten glass.

Similar reference characters refer to similar parts in each of the Figures of the drawings.

PREFERRED EMBODIMENT OF THE INVENTION

Figure 1:
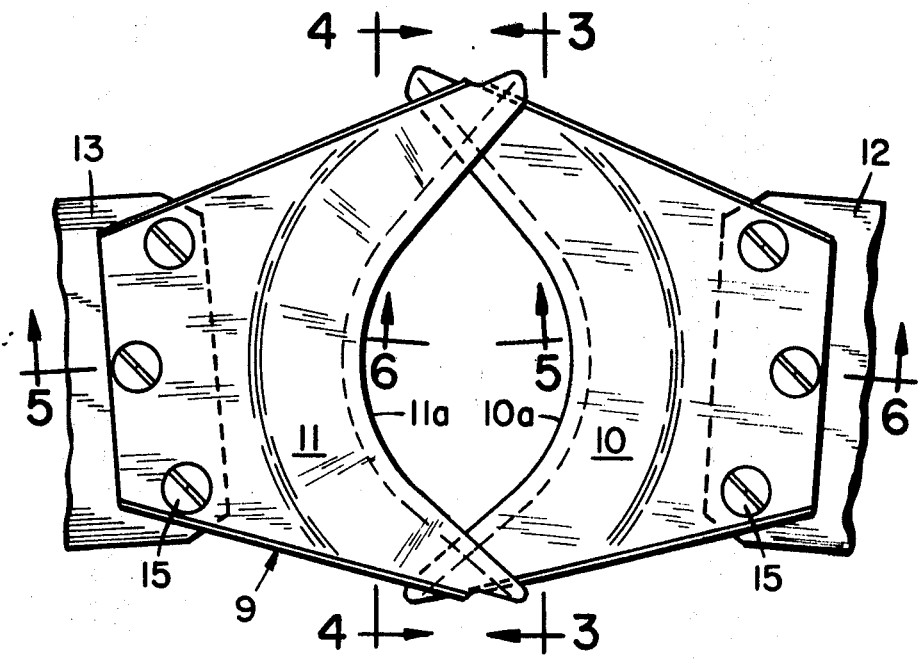
FIG. 1 is a top plan view of a pair of shears embodying the invention.
Figure 2:
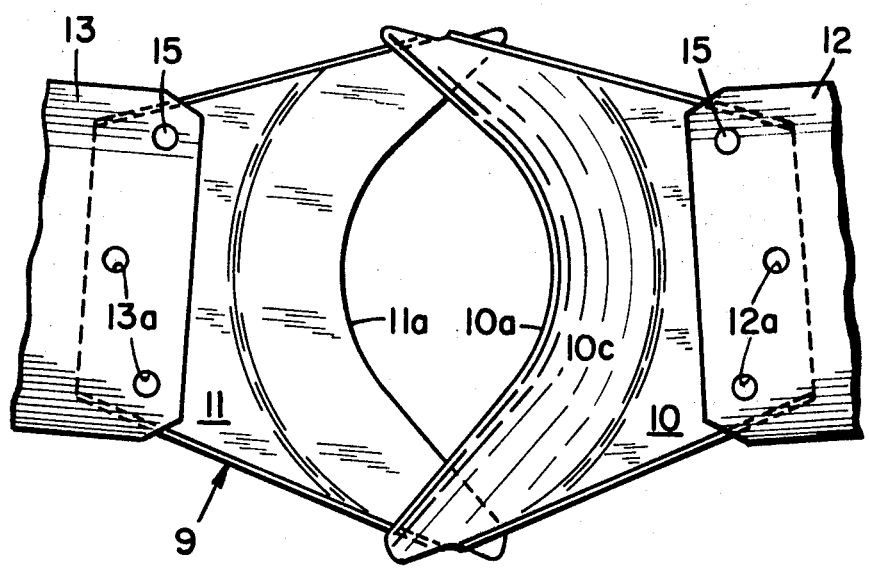
FIG. 2 is a bottom plan view of the shears of FIG. 1.

Referring to the drawings in detail, there is shown in FIGS. 1 and 2 a pair of molten glass shears 9 comprising a lower blade 10 and an upper blade 11 having generally bow-shaped shearing or cutting edges 10a and 11a, respectively. Such blades appear in the plan view of FIG. 1 the same that the blades of a heretofore known conventional pair of molten glass shears would appear in a similar plan view of the latter shears. That is to say, the shape or configuration of blades 10 and 11 in FIG. 1 of the drawings is the same that corresponding blades of a heretofore known pair of molten glass shears would have in a top plan view of the latter blades. Similarly, the shape or configuration of upper blade 11 as shown in the end and cross-sectional views of FIGS. 3 and 5 of the drawings, respectively, is the same that the upper blade of said heretofore known pair of molten glass shears would have in similar end and cross-sectional views, respectively, of the upper blade of the latter pair of shears.

Referring to FIGS. 5 and 6 of the drawings, blades 10 and 11 each embody, adjacent the ends thereof opposite the ends on which cutting edges 10a and 11a are provided, a similar group of three holes such as 10b and 11b in blades 10 and 11, respectively. Blades 10 and 11 are secured to blade-carrying plates 12 and 13, respectively, by suitable screws such as 15 extending through the holes such as 10b and 11b in blades 10 and 11 and screwed into cooperative threaded holes such as 12a and 13a (FIGS. 2, 4 and 5) provided in the respectively associated plates 12 and 13, respectively. Plates 12 and 13 are not shown in their entirety in FIGS. 1 and 2 of the drawings for purposes of simplification of such drawings and because such plates are well known in the art. However, it is pointed out that blade-carrying plates 12 and 13 may, for example, be similar to blade-carrying plates 12 and 13 shown in FIG. 1 of the aforecited patent to Wythe. Under such conditions, plates 12 and 13 of the present invention impart motion to the respectively associated shear blades 10 and 11 to actuate the glass shears of the present invention in a manner similar to the actuation of glass shears of Wythe in the shearing of charges of molten glass. The normal manner of cutting or shearing of charges of molten glass by glass shears as in Wythe is also well known to those skilled in the glass making art.

Referring now to FIGS. 4 and 6, taken in conjunction with FIG. 2 of the drawings, an area 10c of the lower surface of lower shear blade 10 of the pair of molten glass shears 9 embodying the present invention convexly curves downwardly in a curved thick region 10d bordering cutting edge 10a of blade 10 and extending in a curved direction substantially along the length of the bow-shaped cutting edge 10a of blade 10. That is to say, lower blade 10 is provided with a curved region 10d which progressively increases in thickness downwardly and away from cutting edge 10a of blade 10 for a selected distance and for substantially the full length of said cutting edge, said region 10d of increased thickness providing on the lower surface of blade 10 an area 10c which slopes downwardly in a direction away from the lower surface of the cutting edge 10a of the blade and which extends in a curve for substantially the length of such cutting edge.

FIGS. 7, 8 and 9 illustrate schematically the operation of the pair of molten glass shears 9 embodying a lower blade 10 in accordance with the invention. Such pair of shears are shown, in said Figures of the drawings, horizontally disposed below a discharge orifice or molten glass outlet 14 provided in the bottom of a molten glass forehearth 16 and from which a stream or column 17 of molten glass issues to be cut into relatively elongate mold charges each of which are, immediately following the severing of each respective charge, contacted and pushed by the area 10c of the lower surface of blade 10 to impart a turning moment or a moment of turning motion of approximately 90° to each respective charge and cause such charge to assume a generally horizontal attitude in its respective forming mold such as 18 then disposed below said outlet or discharge orifice 14.

Taking each of the FIGS. 7, 8 and 9 separately, FIG. 7 schematically illustrates the molten glass shears 9 prior to cutting edges 10a and 11a of blades 10 and 11 of the shears contacting said stream or column 17 of molten glass to begin the severance of a mold charge such as 20 (FIGS. 8 and 9) from such stream or column. FIG. 8 schematically illustrates blades 10 and 11 of the molten glass shears 9 after the cutting edges 10a and 11a thereof have contacted stream or column 17 of the molten glass, and have moved across and through a part of such stream. FIG. 9 schematically illustrates mold charge 20 immediately following its severance or separation from the parent stream 17 of molten glass and during the contacting of the upper end of such charge by surface 10c of blade 10 and the pushing of the charge to impart the desired turning moment or moment of approximately 90° turning motion thereto the cause it to land in its said forming mold 18 in a substantially horizontal attitude. The fall and turning of mold charge 20 is illustrated in FIG. 9 by dotted outlines of such charge during its progress towards, and after its entrance into the cavity of mold 18 and its contact with the bottom surface of such cavity.

I claim:
1. A pair of shears (9) for severing relatively elongate molten glass mold charges (20) from a parent stream (17) of molten glass issuing from an outlet (14) in a forehearth (16), such shears (9) comprising,
   a. an upper blade (11) having a relatively flat lower surface and a generally bow-shaped cutting edge (11a),
   b. a lower blade (1) having a generally bow-shaped cutting edge (10a) and a relatively flat upper surface for cooperative sliding contact with said surface of said upper blade (11) for said severing of said mold charges (20), such lower blade (10) also having a relatively thick curved region (10d) sloping downwardly and away from the bottom of the cutting edge (10a) of such lower blade (10) for, immediately following said severance of each said mold charge (20), pushing and imparting approximately 90° turning moment to such charge (20).

2. A pair of shears (9) for severing elongate mold charges (20) of molten glass from a parent stream (17) of such glass, such pair of shears (9) comprising;
   a. an upper blade (11) having a relatively flat bottom surface and a substantially concave cutting edge (11a),
   b. a lower blade (10) having a substantially concave cutting edge (10a) and a relatively flat top surface, such cutting edge (10a) being cooperative with said cutting edge (11a) of said upper blade (11) for severing said mold charges (20) from said stream (17) of molten glass, such lower blade (10) also having a bottom surface area (10c) which curves substantially downward from the plane of said cutting edges (10a, 11a) and in directions away from such edge (10a) of the lower blade (10) to provide a relatively steep surface area (10c) bordering the cutting edge (10a) of the lower blade (10) for contacting and imparting a moment of turning motion of approximately 90° to each said mold charge (20) immediately following the severance of the respective charge (20) from said parent stream (17) of glass.